(12) United States Patent
  Gottwals et al.

(10) Patent No.: US 8,915,435 B2
(45) Date of Patent: Dec. 23, 2014

(54) CHARACTERIZATION OF COLOR CHARTS

(71) Applicant: Hewlett-Packard Development Company, L.P., Houston, TX (US)

(72) Inventors: Melanie M. Gottwals, Palo Alto, CA (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/751,025

(22) Filed: Jan. 25, 2013

(65) Prior Publication Data
US 2014/0209682 A1  Jul. 31, 2014

(51) Int. Cl.
  *G06K 7/10* (2006.01)
(52) U.S. Cl.
  CPC .................................. *G06K 7/10544* (2013.01)
  USPC ........................................ 235/454; 235/469
(58) Field of Classification Search
  USPC ................................................ 235/454, 469
  See application file for complete search history.

(56) References Cited

U.S. PATENT DOCUMENTS

| 7,382,492 | B2 | 6/2008 | Fujio et al. | |
| 7,602,525 | B2 | 10/2009 | Arai | |
| 8,059,183 | B2 | 11/2011 | Seto | |
| 8,073,248 | B2 * | 12/2011 | Brunner et al. | 382/165 |
| 2010/0053653 | A1 | 3/2010 | Hatori et al. | |

FOREIGN PATENT DOCUMENTS

| JP | 11-344383 | 12/1999 |
| WO | 2011/089096 A1 | 7/2011 |

* cited by examiner

*Primary Examiner* — Kristy A Haupt
(74) *Attorney, Agent, or Firm* — Hewlett-Packard Patent Department

(57) ABSTRACT

Color chart characterization and techniques related therewith are described herein. In an example, an image including a reproduction of a color chart may be received by a computing system. Data associated with the color chart may be received. The data is encoded in an encoding element located in a substrate including the color chart. The color chart may be automatically characterized based on the received data.

16 Claims, 5 Drawing Sheets

CHARACTERIZATION OF COLOR CHARTS

BACKGROUND

There are a variety of situations where accurate color reproduction in digital imaging is desired. For example, many companies demand that their corporate identities—things such as logos and product advertising—have a consistent look and color, no matter where the actual printing or display occurs. Other examples include taking digital images of products for advertising. If the color in the images is not an accurate representation of the color of the product, the consumers are not able to make informed purchasing decisions.

Color in digital images can be influenced by a variety of factors. One factor is the illumination of the target. The illumination affects the colors sensed by a camera. For example, illumination with fluorescent light can put a green or bluish cast to the colors while illumination with incandescent lights can produce a yellow tint in the colors. In some instances, such as in a photography studio, the illumination can be carefully controlled.

The device taking the image is another significant factor in color reproduction. The device optics can introduce color errors or may not focus enough light on the image detector for accurate acquisition of color in a particular scene. The detector array of the device can be another significant source of color error. The detector array may not be able to produce the full gamut of colors within the scene to a desired level of accuracy. For example, when a user uses a mobile phone to produce images of home furnishings inside the user's home, the color in the images may not accurately represent the color of the target scene.

To facilitate color reproduction, a color calibration chart (also referred to as "color chart") may be used for performing color profiling. For example, a color chart may include known color attributes that can be used to measure colors in an image. Further, color charts may be used to calibrate and/or profile digital input devices such as digital cameras, and scanners and output display systems like printers, monitors and projectors as well as for color correction of an acquired image. A color chart may be constituted as a flat, physical object colored with an arrangement of standardized color samples.

BRIEF DESCRIPTION OF THE DRAWINGS

In order that the present disclosure may be well understood, various examples will now be described with reference to the following drawings.

DETAILED DESCRIPTION

Figure 1:
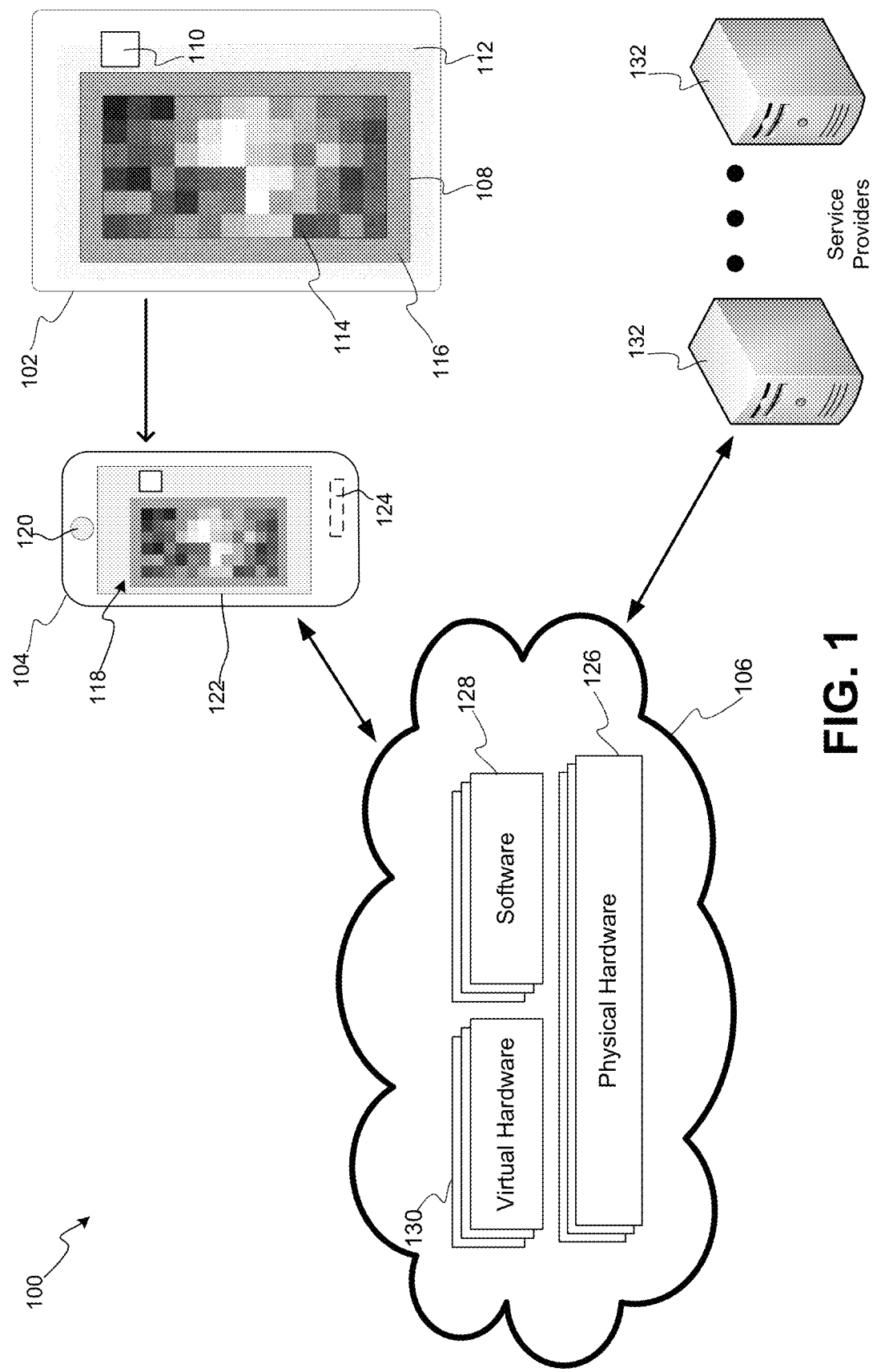
FIG. 1 is an environment in which examples can be implemented.

In the following description, numerous details are set forth to provide an understanding of the examples disclosed herein. However, it will be understood that the examples may be practiced without these details. While a limited number of examples have been disclosed, it should be understood that there are numerous modifications and variations therefrom. While a limited number of examples are illustrated, it will be understood that there are numerous modifications and variations therefrom.

As discussed above, a color chart may be used for color calibration. A color chart may be a standardized color chart provided by a specific provider. In order to perform color calibration, it is generally necessary to associate the color chart with its standard. This might be performed manually by a user. For example, an image of a color chart may be acquired. A user might indicate to a selection system details about the acquired color chart. For example, the user might select a color chart category (e.g., a model or brand of the color reference) from a selection menu. The user selection might be then used by a specific software application to perform color profiling, for example calibration of an image based on the acquired color reference and the indicated color reference category or calibration of the color device based on measurements on the color chart.

However, it might be desirable to automatize identification and/or categorization of a color chart in order to simplify user interaction. It has been described automatic recognition of a color chart by automatically locating a color chart. A color chart may be automatically located by, for example, identifying pre-defined differences between the standardized colors of the color chart and a color chart background. However, such an automatic location of a color chart may be prone to failures due to, for example, a deficient acquisition of the color chart. Further, such an automatic location of a color chart may be computing intensive. The latter may compromise color chart detection by a mobile computing device, which might have limited computing capabilities. Moreover, in such automatic location of color charts, it might be necessary to design a specific detection algorithm for each color chart type to be detected.

At least some of the principles described below solve these challenges by characterizing a color chart based on data encoded in an encoded element located in a substrate including the color chart. More specifically, in an example, an image including a reproduction of a color chart may be received by a computing system. Data associated with the color chart may be received by the computing system. The data is encoded in an encoding element located in the substrate including the color chart. The computing system may automatically characterize the color chart based on the received data.

As can be understood from at least some of the examples described below, providing an encoding element encoding data associated with the color chart facilitates automatized use of a number of charts of different shapes, sizes, layouts, color patch positions and substrates. Each of the charts may be automatically characterized using the data encoded in the encoding element located with the color chart in a common substrate. (It will be understood that the encoding element and the color chart are distinct entities provided in a common substrate.)

Further, in view of some of the examples below, color profiling can be more easily performed since it can be based on the characterization of the color chart. Further, applications that make use of the color chart can be automatically configured based on a chart category identified from data in the encoding element. Thereby, user experience and application flow may be improved by providing a simple interface that automatically characterizes a specific color chart type. Further, a specific application can be easily scaled to support multiple chart types without requiring setting up automatic characterization protocols for each chart type. Moreover, as set forth below, user experience can be expanded by using the data not only to characterize the color chart but also to characterize a particular user, so that applications can be tailored to a specific user by a service provider based on the data encoded in the encoding element.

A color chart is intended to encompass any suitable physical color reference comprised of a set of colors selected to enable generation of a color profile. Such a color profile can be used, for example, for color calibration of a device or color correction of an image. A color chart may be constituted as a flat, physical object colored with an arrangement of standardized color samples (e.g., a plurality of color patches). Color charts, such as the X-Rite color checker, may be rectangular and have a selected size and color patch layout.

An encoding element can be any data bearing element suitable for being located in the color chart substrate. The encoding element may visually encode the data associated with the color chart. For example, it can be an optical machine-readable coded element such as a barcode or, more specifically, a 1D code, a 2D code or, even more specifically, a quick response (QR) code. The encoding element can be configured using any other suitable barcode type or any suitable data-bearing element (proprietary or non-proprietary). For example, the encoding element may be a watermark embedded in the color chart. In addition, the encoding element can be configured using RFID or near-field technologies as well as any other suitable technology that enables locating the encoding element in the color chart substrate such as, but not limited to steganography techniques.

The encoded data may include information that facilitates characterization of the color chart, such as chart brand or type. Further, the encoded data may contain information that can be used to read a specific color chart such as locations of the color patches and chart dimensions. Alternatively, or in addition thereto, encoded data may include a key associated with a database for linking a color chart to specific data such us chart brand, chart type, chart characteristics that enable reading of the color chart. Further, the encoded data may include data that characterizes a user of the color chart.

As used herein, automatic characterization of a color chart refers to automatically determine a characteristic of a color chart based on data from the encoding element. Color chart characterization may include identification of the color chart. For example, based on the encoded data, a system may automatically identify that a color chart is also located in the substrate of the encoding element. Further, color chart characterization may also include automatically assigning a category to the color chart based on the received data. For example, a brand of the color chart can be assigned to the color chart based on data from the encoding element. Further, characterization of the color chart may also include attributing certain properties to the color chart based on the data from the encoding element such as color chart size, position, and configuration (e.g., arrangement of color samples in the chart).

A color chart category refers to a classification of the color chart. For example, a color chart category may be a color chart brand. In another example, a color chart category may be a color chart type that univocally corresponds to a color chart in a color chart database. Multiple categories may be assigned to a color chart. For example, a color chart brand and type might be assigned to a specific color chart. Color chart categories may be associated with characteristics of the color chart that enable univocal correspondence of the color chart or group of an acquired color chart to a general class.

FIG. 1 shows an environment 100 in which examples can be implemented. Environment 100 includes a physical color reference 102, a mobile computing system 104, a cloud computing system 106 (hereinafter referred to as cloud 106), and service provider systems 132.

Physical color reference 102 is shown to include a color chart 108 and an encoding element 110 both located on a substrate 112. More specifically, reference 102 is comprised of a substrate 112 in which color chart 108 and encoding element 110 are located as distinct entities. In the illustrated example, color chart 108 and encoding element 110 are illustrated side by side. It will be understood that there are a variety of configurations for locating color chart 108 and encoding element 110 in substrate 112. For example, encoding element 110 may be embedded in the color chart, as illustrated with respect to FIGS. 8A and 8B.

Color chart 108 is comprised of a plurality of color patches 114 corresponding to a set of colors that enable generation of a color profile, i.e., a set of data that characterizes a color input acquired by mobile computing system 104. (In the Figures, color patches are represented using grey colors for the matter of simplicity.) Color patches 114 are disposed on a chart background 116. The set of colors corresponding to color patches 114 may be standardized, i.e. color of color patches 114 may be selected to correspond to specific colors established for generating a color profile.

Color of color patches 114 may be selected to improve color profiling in specific use cases. For example, color set of color chart 108 might be tuned to be more effective for color profiling of a specific type of scene, such as an outdoor scene, an indoor scene, or any other type of scene. Further, in such cases, encoding element 110 may encode data that identifies the specific use case associated with color chart 108. Thereby, a user might readily obtain information as to for which use cases color chart 108 is most appropriate.

An application, which may run in cloud 106, may access information related to the specific colors associated with a color chart and use an acquired image of color chart 108 for generating a color profile. Further, color chart 108 may also have dimensions (e.g., patch size and position) that are also standardized so that an application can automatically recognize a specific set of colors from an acquired image of color chart 108.

Encoding element 110 is any data bearing element suitable to bear data associated with color chart 108, the data characterizing color chart 108. For example, the data may be data identifying color chart 108, data describing dimensions and/or color chart 108, data categorizing color chart 108 (e.g., a color chart brand or type), or combinations thereof. Encoding element 110 may visually encode the data. For example, encoding element 110 may be a barcode such as a 1D or a 2D barcode and, more specifically a QR code as illustrated below with respect to FIGS. 8A and 8B, as well as any other suitable visual encoding element such as a watermark. In other examples, encoding element 110 may be another suitable data-bearing element such as an encoding element bearing data using RFID or near-field technologies as well as any other suitable technology that enables locating the encoding element in the color chart substrate such as, but not limited to, steganography.

In the illustrated example, only one encoding element 110 is located in substrate 112. In other examples, substrate 112 may bear a plurality of encoding elements bearing data associated with color chart 108. A plurality of encoding elements may be provided for ensuring data redundancy. For example, different types of encoding elements may be provided bearing the same data so that different types of data reading devices are enabled. Further, using a plurality of the encoding elements, which might be of the same type, data associated with color chart 108 can be distributed over different elements for facilitating readability.

Mobile computing system 104 is configured to acquire an image 118 of physical color reference 102 and, more specifically, of color chart 108. In the illustrated example, mobile computing system 104 includes a camera 120 to acquire image 118 and a display 122 to display acquired image 118. In case that encoding element 110 visually encodes the data, it might be advantageous to simultaneously acquire color chart 108 and encoding element 110, as illustrated in the example of FIG. 1.

Mobile computing system 104 may be configured to cause camera 120 to acquire image 118 and to read data from encoding element 110. For example, as illustrated below with respect to FIG. 2, mobile computing system 104 may include (i) an acquisition engine (shown in FIG. 2) to cause camera 120 to acquire image 114 of color chart located on substrate 110, and (ii) a code reading engine (shown in FIG. 2) to read data from encoding element 110. If encoding element 110 is a visual encoding element, the code reading engine may access image 118 to identify and read the visually encoded element. If encoding element 110 implements a non-visual encoding (e.g., RFID or near-field), mobile computing system 104 may include a reader 124 (e.g., a RFID reader or a near-field data reader) operated by the code reading engine to read the code from encoding element 110.

As set forth below with respect to FIG. 2, mobile computing system 104 may include further functional elements for implementing other functions described herein such as color chart characterization as well as color profiling and/or configurations of software applications in the system based on data from encoding element 110. Such further functionality may be provided as services via cloud 106.

Mobile computing system 104 is configured to communicate with cloud 106. For example, mobile computing system 104 may transmit data to cloud 106 and receive data from cloud 106 via a network (not shown) such as the internet or any other suitable network. Data transmitted to cloud 106 may be the acquired image as well as data encoded in encoding element 110. (If data is visually encoded, then the acquired image may already include the data if encoding element 110 is imaged with color chart 108.)

Cloud 106 is a computing system including multiple pieces of hardware operatively coupled over a network so that they can perform a specific computing task and, more specifically, deliver services to mobile computing system 104. Cloud 106 includes a combination of physical hardware 126, software 128, and virtual hardware 130. Cloud 106 is configured to receive requests and/or data from mobile computing device 104, and (ii) return request responses and/or data to mobile computing device 104 for implementing specific services. By way of example, cloud 106 may be a private cloud, a public cloud or a hybrid cloud. Further, cloud 106 may be a combination of cloud computing systems including a private cloud (or multiple private clouds) and a public cloud (or multiple public clouds).

Physical hardware 126 may include, among others, processors, memory devices, and networking equipment. Virtual hardware 130 is a type of software that is processed by physical hardware 126 and designed to emulate specific software. For example, virtual hardware 130 may include a virtual machine (VM), i.e. a software implementation of a computer that supports execution of an application like a physical machine. An application, as used herein, refers to a set of specific instructions executable by a computing system for facilitating carrying out a specific task. For example, an application may take the form of a web-based tool providing users with color chart characterization based on data encoded in encoding element 110 and/or color profiling functionality based on image 118 of color chart 108. Software 128 is a set of instructions and data configured to cause virtual hardware 130 to execute an application for providing a service to mobile computing device 104. Thereby, cloud 106 can make applications related to color profiling, or any other type of service, available to mobile computing device 104.

Service provider systems 132 represent on-premise systems of service providers that may provide a service to a user of mobile computing system 104 via cloud 106. Such services can be configured based on data in encoding element 110. For example, systems 132 may correspond to print service providers that may offer a print service to a user of mobile computing device 104 via a software application (e.g. application 216 shown in FIG. 2) operated in cloud 106. This print service may be branded to a specific service provider via data in encoding element 110. More specifically, encoding element 110 may identify that color chart 108 is sponsored by a particular print service provider so that a software application running in cloud 106 can be tailored to provide a service particularly tied to the specific print service provider. Further, encoding element 110 may include data characterizing the user of mobile computing device 104 so that it can indicate the intended end user for a specific service. Thereby, services may be branded to a particular printing company and configured for a specific user by operating a software application to comply with data in encoding element 110. Examples of such services are set forth below with respect to FIG. 6.

It will be understood that environment 100 is merely an example and that other environments for implementing examples are foreseen. For example, functionality for color profiling, color chart characterization (e.g., identification and/or categorization), and software application configuration may be implemented in mobile computing device 104, which might then implement services described herein independently from cloud 106.

Figure 2:
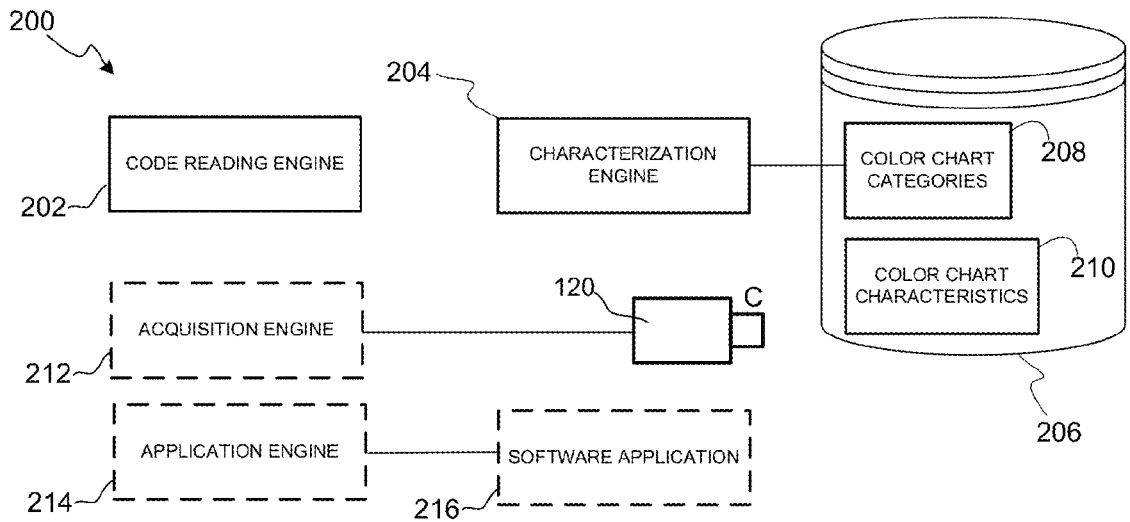
FIGS. 2 and 3 depict examples of physical and logical components for implementing various examples.
Figure 3:
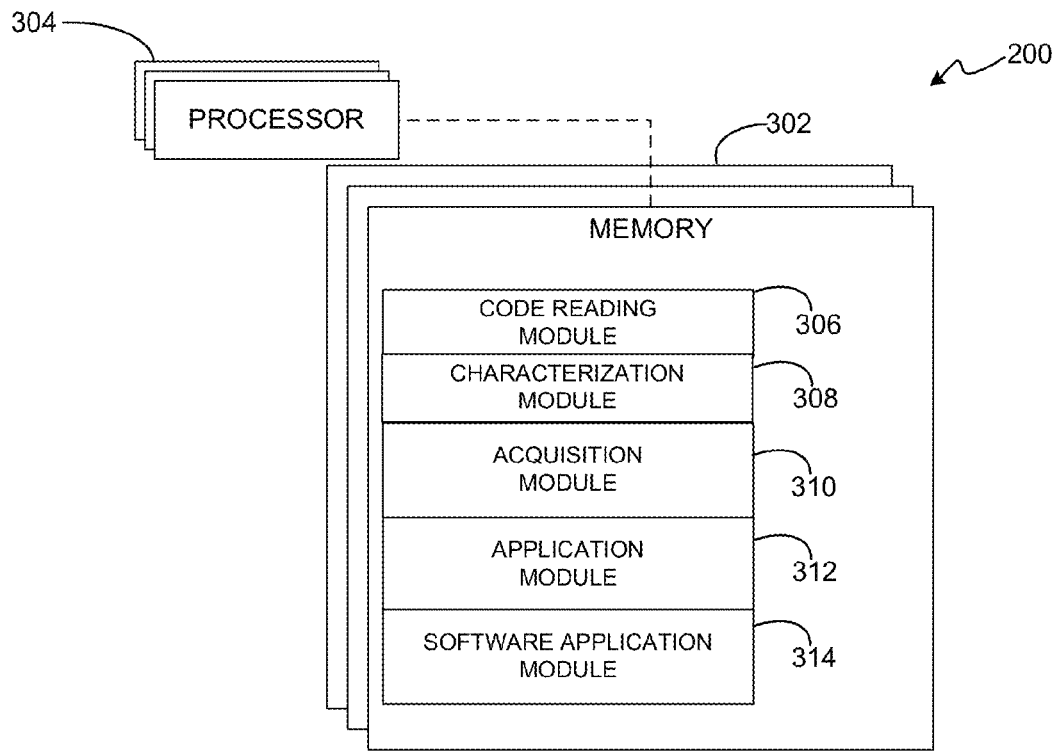

FIGS. 2 and 3 depict examples of physical and logical components for implementing various examples. FIG. 2 depicts a system 200 for automatically characterizing a color chart. In the example of FIG. 2, system 200 includes a code reading engine 202 and a characterization engine 204.

Code reading engine 202 represents, generally, any combination of hardware and programming configured to read data from encoding element 110. If encoding element 110 visually encodes data associated to color chart 108, code reading engine 202 may analyze acquired image 118 to locate an imaged encoding element. Upon locating an imaged visual encoding element, color reading engine 202 may analyze it to read the data. In case that encoding element 110 can be acquired by reader 124 (e.g. encoding element 110 uses RFID or near-field technologies), code reading engine 202 may receive and read data acquired by reader 124.

Characterization engine 204 represents, generally, any combination of hardware and programming configured to automatically characterize color chart 108 based on the data read by code reading engine 202. Examples of color chart characterization are set forth below with respect to FIGS. 4 and 5.

In case that color chart characterization by characterization engine 204 includes color chart categorization, characterization engine 204 may access a storage device 206 including a database 208 of color chart categories. For example, database 208 may include data records associating codes that can be read from encoding element 110 with color chart categories such as color chart brand or type. Acquisition engine may validate encoded data with color chart categories in the database and assign to color chart 108 a category in database 208 corresponding to the encoded data.

Further, storage device 206 may include a database 208 of color chart characteristics that can be accessed by characterization engine 204 for performing color chart characterization. For example, database 210 may include data records associating codes that can be read from encoding element 110 with color chart characteristics such as color chart dimensions and other characteristic such as standardized colors of the color chart, as well as number, size, and position of color patches.

Databases 208 and 210 may be interrelated. For example, characterization engine may infer a color chart category from database 208 using a read code and infer a color chart characteristic from database 210 using the inferred color chart brand. Databases 208 and 210 may be integrated in the same database. Further, databases 208 and 210 may be distributed over a plurality of storage devices.

Storage device 206 represents generally any memory capable of storing data that can be accessed by characterization engine 204 in the performance of its functions. It might be constituted as a single storage device (e.g., a memory of mobile computing system 104 or one of service provider systems 132) or as a storage device system constituted of a plurality of storage devices that may be integrated in a single device or distributed over communicatively coupled devices (e.g., cloud 106).

As illustrated by FIG. 2, system 200 may include further engines for implementing further functionality. For example, system 200 may include an acquisition engine 212 and/or an application engine 214.

Acquisition engine 212 represents, generally, any combination of hardware and programming configured to cause acquisition of image 118, which in the example illustrate in FIG. 1 includes a reproduction of color chart 108 located on substrate 112. It will be understood that there are a variety of manners of implementing an image acquisition engine. As illustrated in FIG. 2, acquisition engine 212 may be operatively connected to camera 120. Acquisition engine 212 may cause camera 120 to acquire image 118 and process data representing image 118. If code reading engine 202 is to read a visually code, acquisition engine 212 may transmit the image data thereto, so that it might process a reproduction of the visual encoding element and read the data associated with color chart 108. Further, acquisition engine 212 may transmit image data to a software application that may implement color profiling as further detailed below.

System 200 may include a software application 216. More specifically, software application 216 may be to perform color profiling based on an acquired image of color chart 108 (e.g., image 118). Generally, color profiling can be performed by knowing a priori which type of color chart 108 is being processed in order to assess differences between acquired colors and actual colors. In order to increase scalability of software application 216, it is advantageous that software application 216 can be configured to process different color chart types. Software application 216 may be, in general, any application for providing a specific service via mobile computing device 104.

Application engine 214 represents, generally, any combination of hardware and programming to configure software application 216 based on the data encoded in encoding element 212. For example, software application 216 can be configured based on data in encoding element 110 to perform color profiling based on color chart 108, acquired by acquisition engine 212, without requiring a user input/selection or cumbersome automatic detection of color chart 108. In other words, the code in encoding element 110 may be used to straightforwardly indicate to software application 216 which type of color chart can be used for the color profiling.

Further, configuration of software application 216 based on data in encoding element 212 may be used to provide configurable services tailored in view of, for example, chart category and/or end user of color chart 118. For example, referring to FIG. 1, software application 216 may be related to one of service providers 132 and be designed to deliver a specific service to a specific user of mobile computing device 104 using data in encoding element 110.

The specific service may be tailored by branding software application 216 to the specific service provider. For example, a generic software application (i.e., not tied to a specific service provider or user) running in mobile computing device 104 can transmit to cloud 106 data from encoding element 110. In response, mobile computing device 104 may run, via cloud 106, a branded and functional software application skinned for a specific use case with functionality relevant to that specific user. Thereby, functionality of a software application capable of delivery different services can be simplified based on the use case, which would be defined by data encoded in encoding element 110. This configurability of software application 216 open options for providing via software application 216 different targeted services such as sales services, operational services, quality control service, or other types of services. Some examples of such services are set forth below with respect to FIG. 6.

Elements of system 200 may be integrated in a single device (e.g., mobile computing system 104) or may be distributed over multiple computing systems. Regarding the latter examples, in an example, acquisition engine 212 and camera 120 are implemented in mobile computing system 104 and code reading engine 202 and characterization engine 204 as well as data storage 206 are implemented in cloud 106, or any other computing system suitable to implement these elements (e.g., a server, not shown, communicatively coupled to mobile computing system 104 over a network, not shown). Application engine 214 and software application 216 may be implemented then on cloud 106 or mobile computing system 104. It will be understood that there are a number of alternatives for distributing elements of system 200 over multiple components.

In foregoing discussion, various components were described as combinations of hardware and programming. Such components may be implemented in a number of fashions. Referring to FIG. 3 the programming may be processor executable instructions stored on a tangible memory media 302 and the hardware may include a processor 304 for executing those instructions. Memory 302 can be said to store program instructions that when executed by processor 304 implement system 200 of FIG. 2. Memory 302 may be integrated in the same device as processor 304 or it may be separate but accessible to that device and processor 304.

In one example, the program instructions can be part of an installation package that can be executed by processor 304 to implement system 200. In this case, Memory 302 may be a portable medium such as a CD, DVD, or flash drive or a memory maintained by a server from which the installation package can be downloaded and installed. In another example, the program instructions may be part of an application or applications already installed. Here, memory 302 can include integrated memory such as a hard drive.

In FIG. 3, the executable program instructions stored in memory 302 are depicted as a code reading module 306, a characterization module 308, an acquisition module 310, an application module 312, and a software application module 314. Code reading module 306 represents program instructions that when executed cause the implementation of code reading engine 202 of FIG. 2. Likewise, characterization module 308 represents program instructions that when executed cause the implementation of characterization engine 204 of FIG. 2. Likewise, acquisition module 310 represents program instructions that when executed cause the implementation of acquisition engine 212 of FIG. 2. Likewise, application module 312 represents program instructions that when executed cause the implementation of application engine 214 of FIG. 2. Likewise, software application module 314 represents program instructions that when executed cause the implementation of software application 216 of FIG. 2.

Figure 4:
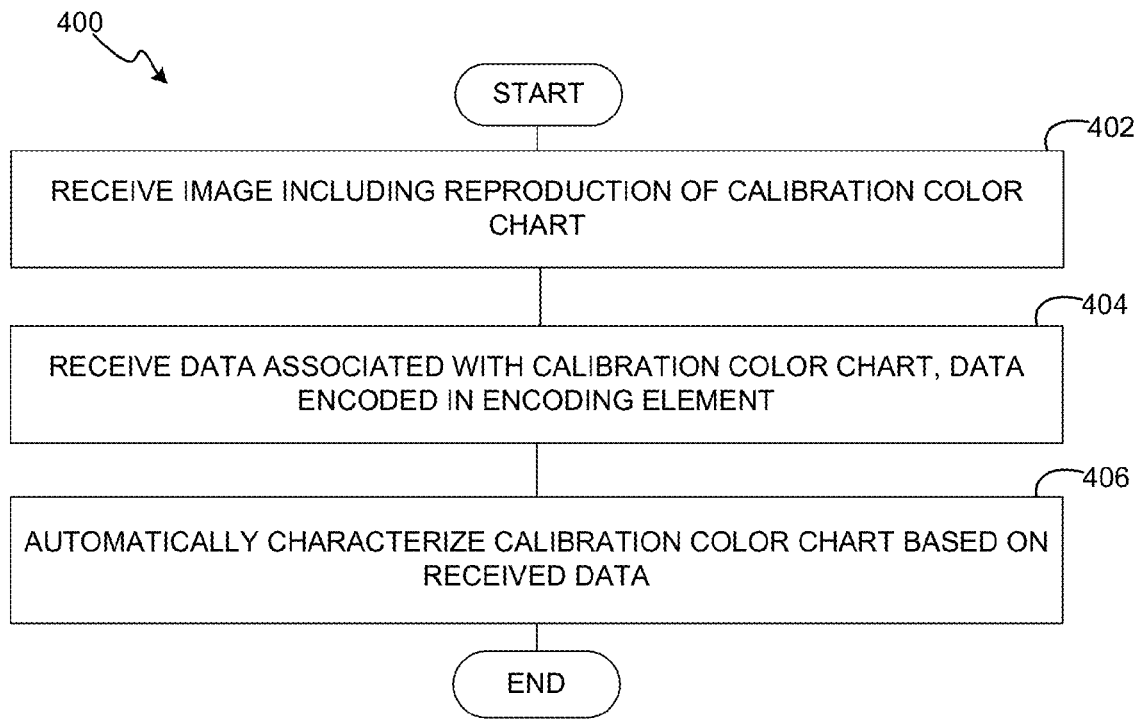
FIGS. 4 to 7 are exemplary flow diagrams to implement examples herein.
Figure 5:
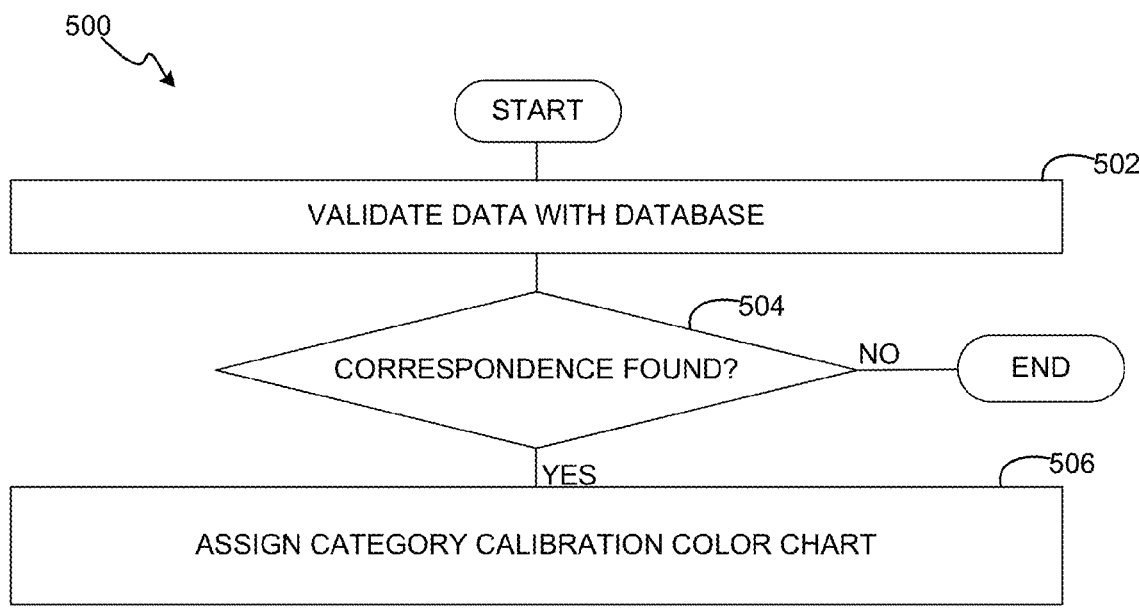
Figure 6:
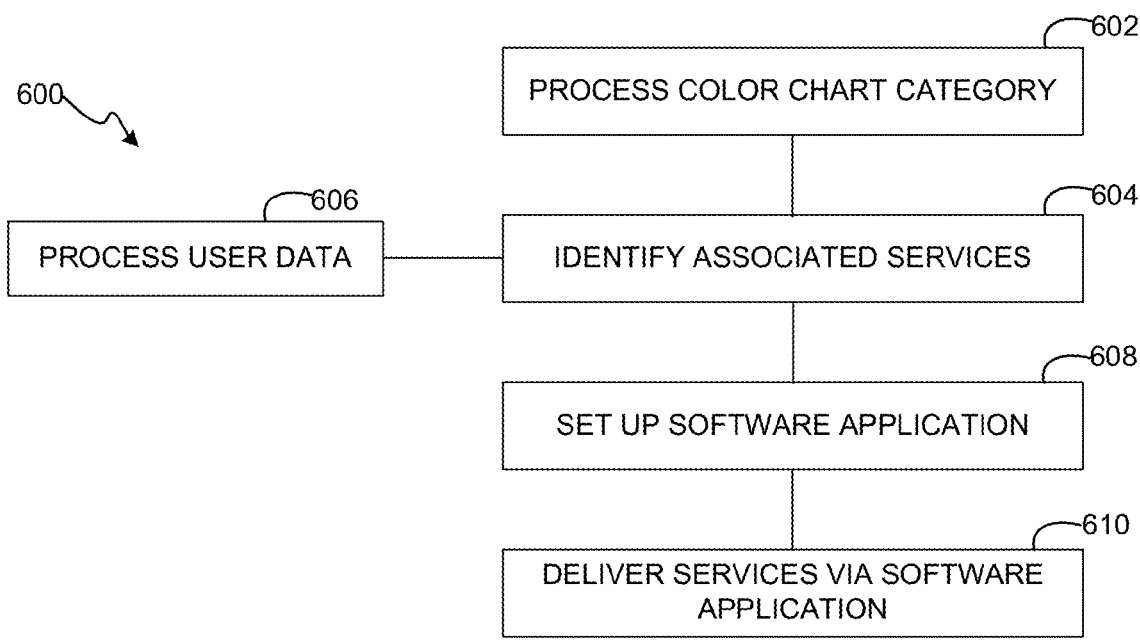

FIGS. 4 to 6 are exemplary flow diagrams to implement examples herein. In discussing FIGS. 4 to 6, reference is made to the diagrams in FIGS. 1 to 4 to provide contextual examples. Implementation, however, is not limited to those examples. Reference is also made to the examples depicted in FIGS. 8A and 8B. Again, such references are made simply to provide contextual examples.

Referring to FIG. 4, a process flow 400 includes a block 402 of receiving image 118 including a reproduction of color chart 108. Referring to FIG. 2, characterization engine 204 may be responsible of implementing block 402. More specifically, characterization engine 204 may receive image 118 from acquisition engine 212 operating camera 120 for acquiring the image.

Process flow 400 further includes a block 404 of receiving data associated with color chart 108. The received data is encoded in encoding element 110 located in substrate 112 that includes color chart 108. Referring to FIG. 2, code reading engine 202 may be responsible of implementing block 404. More specifically, in case the data is visually encoded in encoding element 110, code reading engine 202 may access image 118 including a reproduction of encoding element 110 and visually decode the data herein. In case the data is encoded by other means, code reading engine 202 may communicate with reader 124 for decoding the data in encoding element 110.

Process flow 400 further includes a block 406 of automatically characterizing color chart 108 based on the received data. Referring to FIG. 2, characterization engine 204 may be responsible of implementing block 402.

Characterization may include identifying color chart 108 based on the received data. For example, encoding element 110 may encode data indicating that substrate 112 includes a color chart. In an example application, mobile computing device 104 may acquire an image of substrate 112. Encoding element 112 may visually encode data identifying color chart 108. The data may be decoded so that it is identified that substrate 112 includes color chart 108. This data may include further data that enables detection of color chart 108 such as position relative to encoding element 110, shape, as well as number and position of color patches. The detection may then be facilitated based on this data so that measurement of color chart 118 is more straightforward as compared to a measurement of color chart 108 that requires detection of color chart 118 without making use of data specifying characteristics of the color chart.

Color chart characterization may also include assigning a category to color chart 108. Referring to FIG. 5, a process flow 500 is to assign a category to color chart 108. Process flow 500 includes a block 502 of validating received encoded data with a database of color chart categories. For implementing this block, characterization engine 204 may process data associated with color chart 108, e.g., data received at block 404 of process flow 400 in FIG. 4. Then, characterization engine 204 may access database 208 of color chart categories and use the received data with database 208 for determining a color chart category associated with color chart 108. For example, database 208 may be a look-up table relating keys that can be encoded in encoding element 110 to color chart brands. It will be understood that there are a variety of database types and corresponding methods that can be used to validate the data. The result of block 502 may be finding a category in the database corresponding to the received data.

At block 504 it is evaluated whether, at block 502, a correspondence of the validated data is found in the database. If no correspondence is found, process flow is finished. In examples, a signal may be generated to indicate the user of mobile computing device 104 that no correspondence could be found with respect to color chart 108. If a correspondence is found, process flow 500 moves to block 506 for assigning a category to the received data. This category corresponds to the received data and is determined in the validation of block 502.

Assigning may include associating, in a memory, color chart 108 in image 118 with the validated category. This memory may be located, for example, in mobile computing device 104 or cloud 106. The validated category may be signaled to a user of mobile computing device 104. Further events may be triggered when a category is validated. For example, if the category is a brand, a service provider 132 may be informed that a specific user is making use of an imaging target of its brand. Further, categorization may trigger a service, or set of services, that can be tailored based on the assigned category as set forth below with respect to FIG. 6.

In examples herein, a software application can be set up based on a category assigned to color chart 108. Thereby, processes associated specifically with color chart 108 can be tailored in a straightforward manner. For example, such a configurable software application can be for providing a specific service to the user of color chart 108. Further, such a specific software application can be for performing color profiling based on color chart 108. Setting up such a software application based on data in encoding element 110, located with color chart 108 in same substrate 112, facilitates a more straightforward delivery of services associated with color chart 108 (e.g. color profiling) via data provided along color chart 108. Such examples are illustrated below with respect to FIGS. 6 and 7.

Referring to FIG. 6, a process flow 600 is shown for implementing examples of services provision to a user of mobile computing device 104. The services are provided via software application 216 (depicted in FIG. 2). At block 602, a color chart category is processed. The color chart category may be determined as set forth above with respect to FIG. 5. At block 604, services associated to the specific color chart category of 604 are identified. Identification of the associated services may be performed by a service handler (not shown) running in cloud 106.

User data may also be used to identifying the associated services. For example, at block 606, user data may be processed to identify the associated service at block 606. The user data may be provided via encoding element 110 or using other means such as, for example, identification of a user mapped to mobile computing device 104 or receiving a user input that identifies the user requesting a set of specific services (e.g., a user key).

Processing the color chart data and the user data at the identification in block 604 facilitates triggering different use cases or roles with different functionality for providing services. For example, referring to FIG. 1, a code on encoding element 110 may identify that color chart 108 is sponsored by a specific printing company (which might operate one of service provider systems 132) and is intended for a specific end user (e.g., the user operating mobile computing device 104). Thereby, a specific service (which can be delivered via a software application running in mobile computing device 104 and operated in interaction with cloud 106) can be tailored to the specific printing company and the specific end-user.

Such a service might be an end user application enabling the user to capture the data in physical color reference 102 and communicate with a specific support service (e.g., designers at the specific printing company to which color chart 108 corresponds) selected based on the detected end user. Another service might be, for the same specific printing company, for another custom set of color cards identified by corresponding data in encoding element 110, to trigger functionality for a sales person to evaluate if a sample color captured by mobile computing device 104, and calibrated using color chart 108, is within particular color press gamuts that the specific printing company can offer with different printing presses. Thereby, price information can be obtained regarding reproduction of corresponding print jobs with different printing presses. As set forth above, such services may be provided via a software application that may morph based on data in encoding element 110. It will be understood that other services might be configured via data in encoding element 110.

Referring back to FIG. 6, at block 608 a software application is set up to deliver the services identified in block 604. In general, a software application may be set up based on the assigned category. Further, in case encoding element 110 encodes data that characterizes a user of color chart 108, the software application may be set up based on the characterized user. The software application, in this example, is to provide a service from a service provider (e.g., one of service providers 132 in FIG. 1). The setting up in this example is for configuring the service to one of a specific service provider, a characterized user, or both. Examples of such specifically configured services are set forth in the previous paragraphs.

Figure 7:
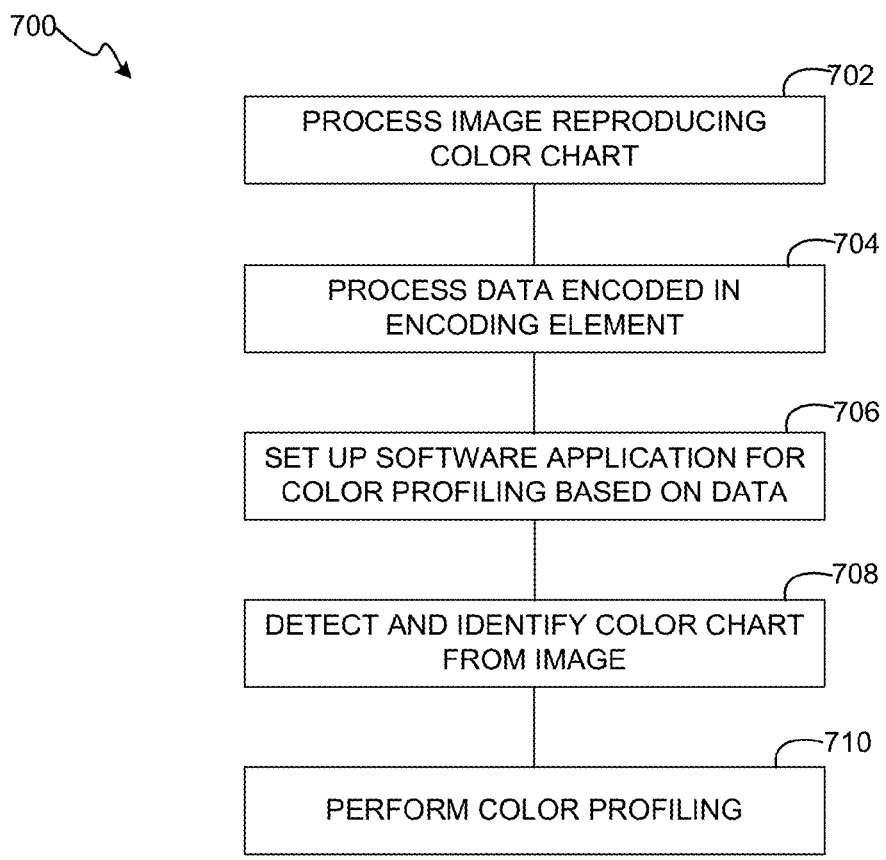

As set forth above, data in encoding element can be used to facilitate color profiling based on an acquisition of color chart 108. Referring to FIG. 7, a process flow 700 is shown for implementing examples of color profiling using data encoded in encoding element 110. At block 702 an image (e.g., image 118) reproducing a color chart (e.g., color chart 118) is processed.

Generally, if color profiling is for color calibration, e.g., color calibration of camera 120, the acquired image is targeted to merely acquiring a color chart. If the encoding element visually encodes data associated with the color chart, the acquired image may encompass the color chart and the encoding element, so that data associated with the color chart can be extracted from the same image used to reproduce the color chart. FIG. 8B shows one example of a physical color reference 102 including a color chart 801 and a visual encoding element 806. Color chart 801 is comprised of a plurality of color bars 804. Element 806 is embedded in color chart 801 and, in this example, it is a QR code containing data associated with color chart 801.

Referring back to FIG. 7, at block 704, data encoded in an encoding element is processed. For example, looking at the example of FIGS. 8A and 8B, data in encoding element 806 may be extracted by processing image 808. In case that data is encoded non-visually in the encoding element (e.g., by RFID means), then a suitable reader (e.g., reader 124 described above with respect to FIG. 1) may be used to access the data associated with the color chart.

At block 706, a software application for color profiling is set up based on the data processed at block 704. Setting up software applications is set forth above with respect to FIG. 2. At block 708, the color chart is detected and identified. This might be performed by the software application set up at block 706. More specifically, setting up the software application based on data from the encoding element may facilitate the detection and identification of the color chart as set forth above with respect to FIG. 4.

At block 710, color profiling is performed based on the color chart detected and identified at block 708. Color profiling may be for calibration of a device used to acquire the color chart, or devices associated therewith (e.g., a display). Color profiling may be for color identification and/or color calibration in an acquired scene. In particular, color identification may be for obtaining calibrated colors from one or more element of the acquired scene. This is illustrated in the following with respect to FIG. 8A.

Figure 8A:
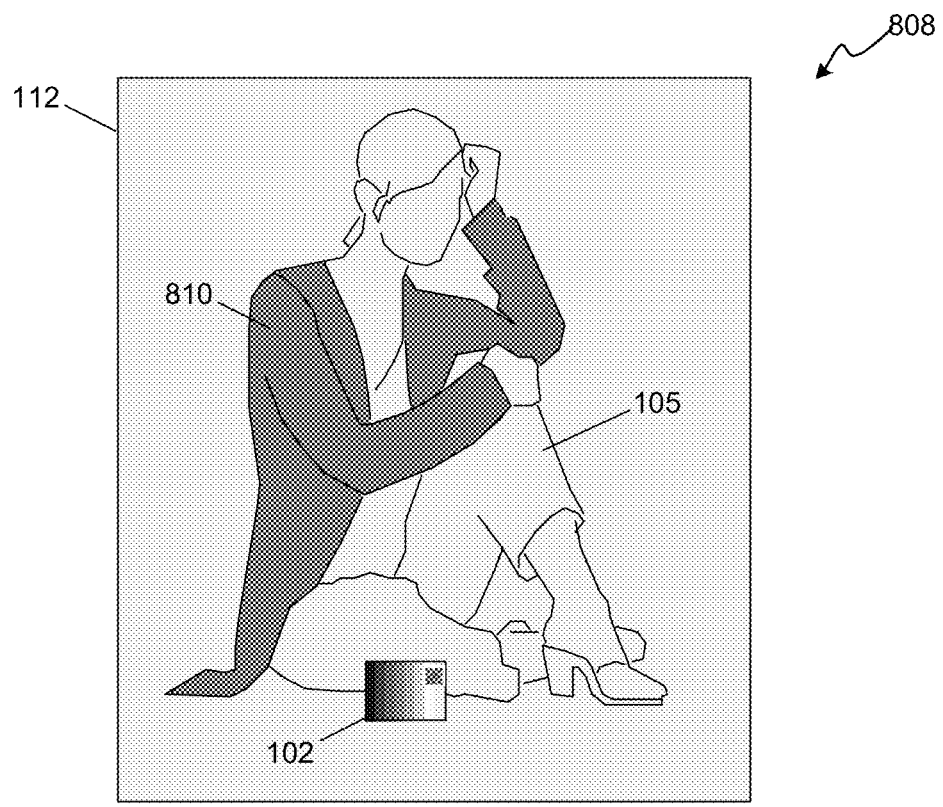
FIG. 8A shows an image with an embedded physical color reference according to an example.
Figure 8B:
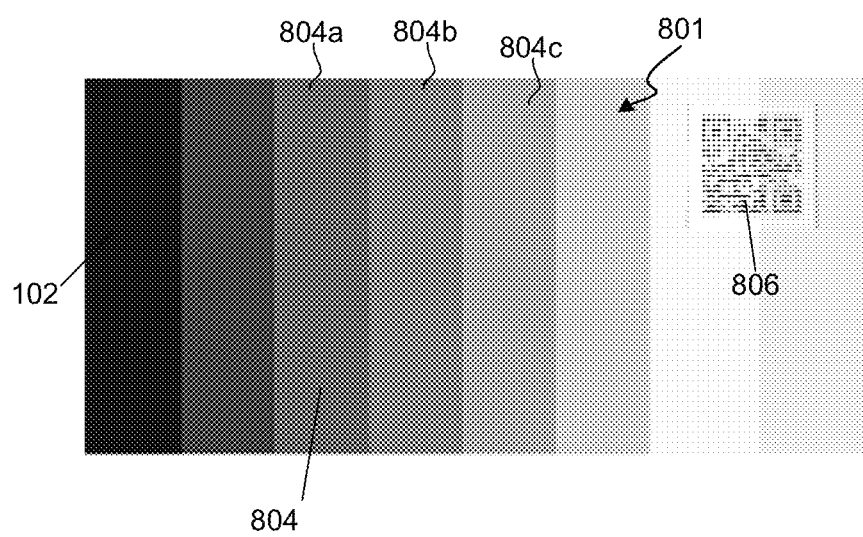
FIG. 8B is a close-up of the embedded physical color reference.

FIG. 8A shows an image 808 of an image of woman wearing a jacket 810 sitting with physical color reference 102 propped against her knee. For purposes of illustration, the color chart in FIG. 8A is simplified to include a series of gray scale bars 804 with differing tonalities. Each of bars 804 in color chart 801 has known optical characteristics. The color of the woman's jacket is similar, but not identical to three of bars 804, namely bars 804a to 804c. The color of the jacket is most similar to center bar 804b in color chart 801. To precisely identify the color of the jacket, an interpolation of between the similar color bars can be performed by the software application at block 710. For example, the interpolation may determine that the color of the jacket lies between a left bar 804a and the center bar 804c. Because the optical characteristics of the blocks are known, they can be used to identify colors within the target scene, even if the colors in the digital image of the scene and colorimetric reference are inaccurate due to an improper calibration of the device used to acquire the image. In this example, encoding element 806 facilitates automatic characterization of color chart 801 and, hence, color profiling based thereon.

It will be appreciated that examples above can be realized in the form of hardware, programming or a combination of hardware and the software engine. Any such software engine, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a tangible computer-readable storage medium that are suitable for storing a program or programs that, when executed, for example by a processor, implement embodiments. Accordingly, embodiments provide a program comprising code for implementing a system or method as claimed in any preceding claim and a tangible or intangible computer readable storage medium storing such a program. A tangible computer-readable storage medium is a tangible article of manufacture that stores data. (It is noted that a transient electric or electromagnetic signal does not fit within the former definition of a tangible computer-readable storage medium.)

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, at least the terms "include" and "comprise" are used as open-ended transitions.

What is claimed is:

1. A method performed by a computing system, comprising:
   receiving, by the computing system, an image including a reproduction of a color chart;
   receiving, by the computing system, data associated with the color chart, wherein the data is encoded in an encoding element located in a substrate including the color chart; and
   automatically characterizing, by the computing system, the color chart based on the received data, including referencing a database of color chart categories based on the received encoded data, and assigning to the color chart a category in the database corresponding to the received data.

2. The method of claim 1, wherein automatically characterizing includes identifying the color chart based on the received data.

3. The method of claim 1, wherein the category is a color chart brand.

4. A computer software product comprising a tangible medium readable by a processor, the medium having stored thereon a set of instructions for identifying a color chart, the instructions comprising:
   a set of instructions which, when loaded into a memory and executed by the processor, causes automatically characterizing a color chart based on data encoded in an encoding element located in a substrate including the color chart, the encoded data further includes data that characterizes a user of the color chart; and
   a set of instructions which, when loaded into a memory and executed by the processor, causes setting up a software application based on the characterized user.

5. The product of claim 4, further comprising a set of instructions which, when loaded into a memory and executed by the processor, causes identifying a color chart from an image acquired by a mobile device based on the encoded data.

6. The product of claim 4, wherein the encoding element is a visual encoding element and the product further comprises a set of instructions which, when loaded into a memory and executed by the processor, causes visually reading the encoded data.

7. The product of claim 6, wherein the encoding element is a barcode.

8. The product of claim 4, further comprising a set of instructions which, when loaded into a memory and executed by the processor, causes automatically assigning a category to the color chart based on the encoded data.

9. The product of claim 8, further comprising a set of instructions which, when loaded into a memory and executed by the processor, causes setting up a software application based on the assigned category.

10. The product of claim 4, wherein, the software application is to provide a service from a service provider, the setting up being for configuring the service to one of a specific service provider, a characterized user, or both.

11. The product of claim 4, wherein the instructions are to be executed by a processor in a mobile computing device.

12. The product of claim 4, wherein the instructions are to be executed by a processor in a computing device remote from a mobile computing device including a camera, wherein the mobile computing device is to:
   acquire an image including a reproduction of the color chart;
   read the data encoded in an encoding element; and
   transmit the image and the data to the computing device.

13. A system for automatically characterizing a color chart, comprising:
   a code reading engine to read data from an encoding element located in a substrate, the encoding element encoding data that characterizes the color chart; and
   a characterization engine to automatically characterize a color chart based on the data, by referencing a database of color chart categories based on the received data, and assigning to the color chart a category in the database corresponding to the received data.

14. The system of claim 13, wherein the system is included in a mobile computing device that further includes:
   a camera;
   an acquisition engine to cause acquisition of an image of the color chart located on the substrate.

15. The device of claim 13 further comprising an application engine to configure, based on the data, a software application.

16. The device of claim 15, wherein the software application is to perform color profiling based on the acquired image of the color chart.

* * * * *